G. INDORANTE.
BALANCING AEROPLANE.
APPLICATION FILED MAY 22, 1912.
1,047,641.
Patented Dec. 17, 1912.
3 SHEETS—SHEET 1.
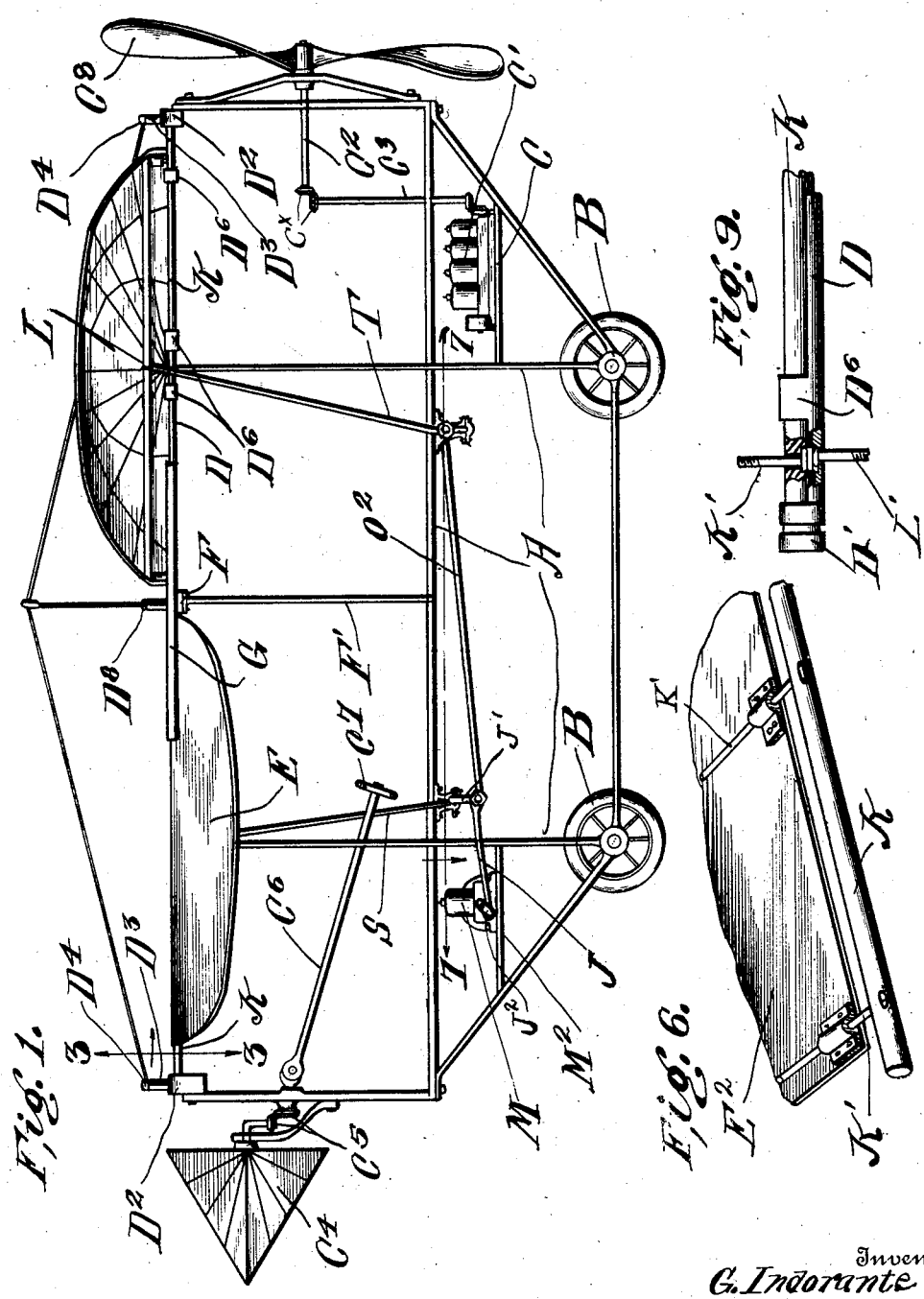

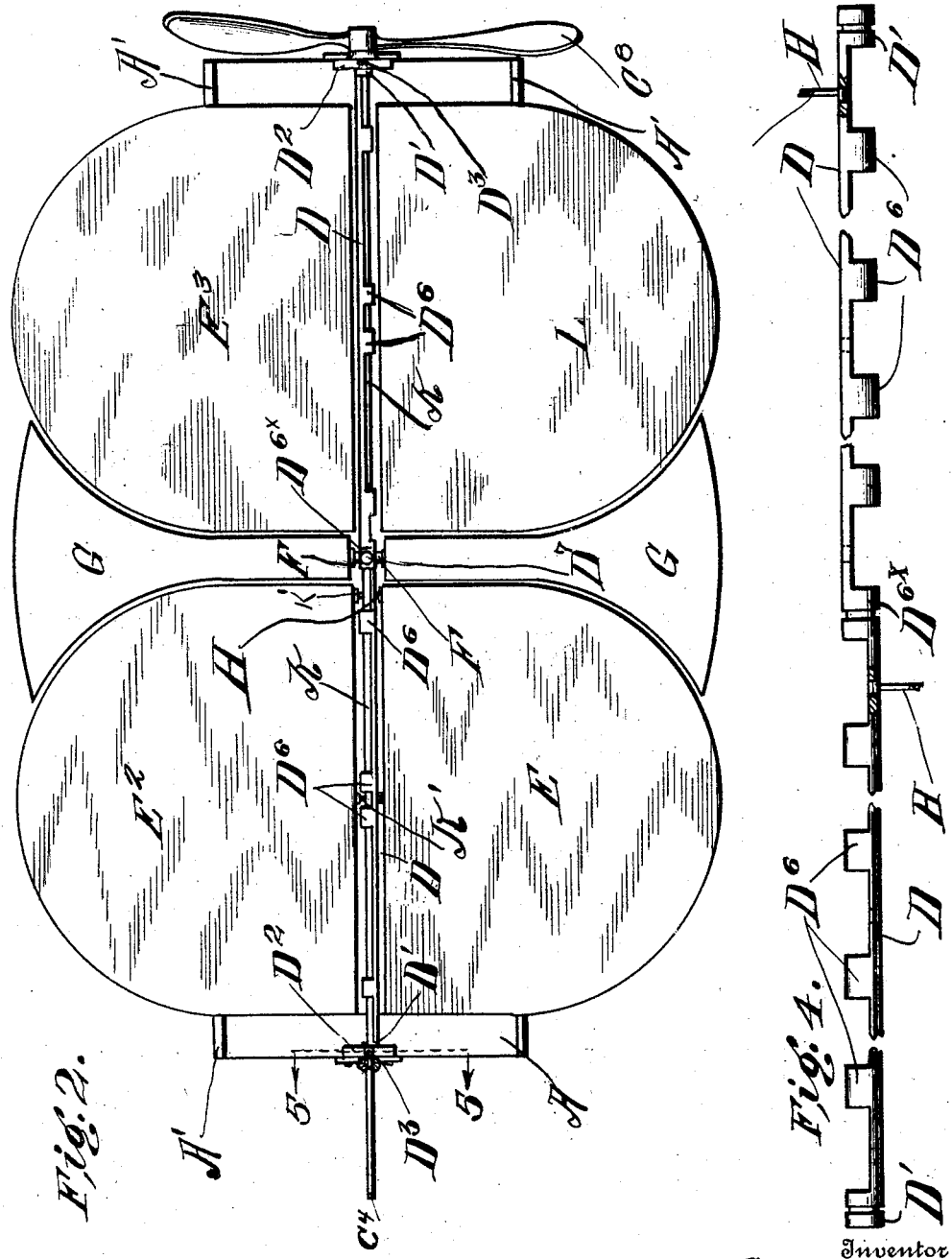

G. INDORANTE.
BALANCING AEROPLANE.
APPLICATION FILED MAY 22, 1912.
1,047,641.
Patented Dec. 17, 1912.
3 SHEETS—SHEET 3.
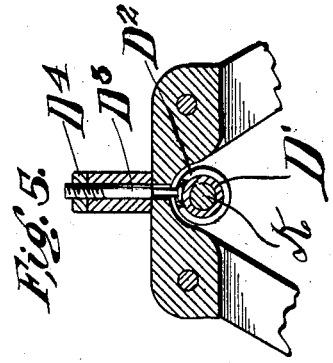
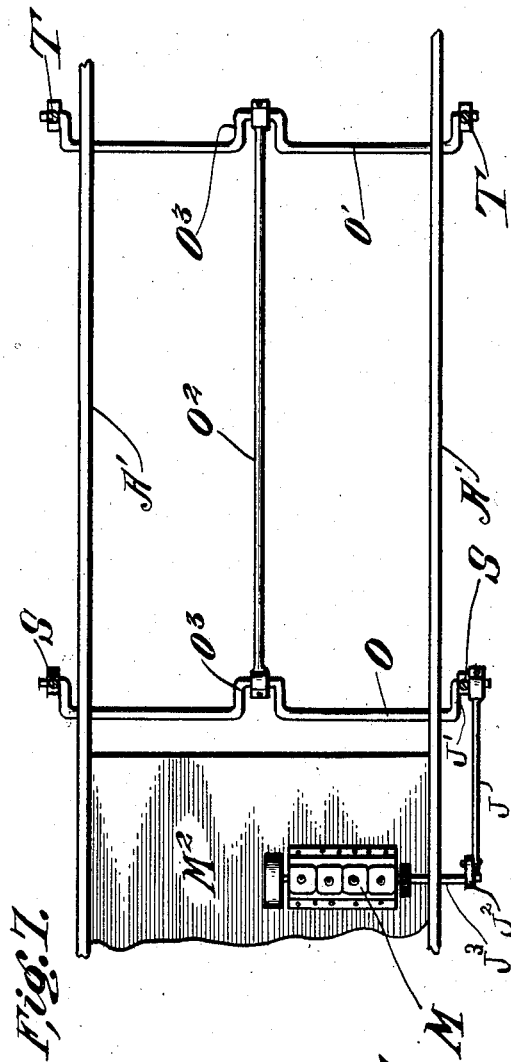
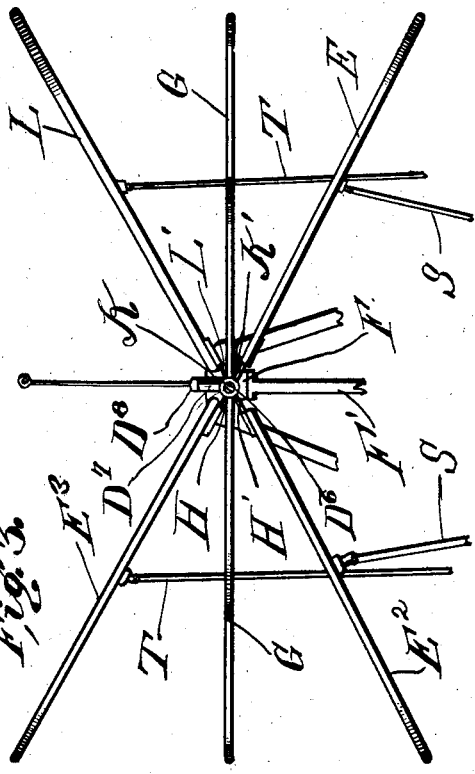
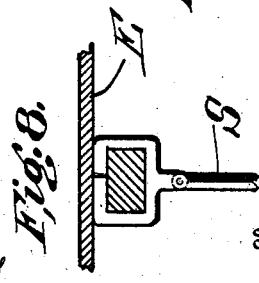
Witnesses
Rohr Meyer.
J. H. Sherwood.
Inventor
G. Indorante
By Franklin N. Hoyt
Attorney

UNITED STATES PATENT OFFICE.

GAETANO INDORANTE, OF KANKAKEE, ILLINOIS.

BALANCING AEROPLANE.

1,047,641.  Specification of Letters Patent.  Patented Dec. 17, 1912.

Application filed May 22, 1912. Serial No. 698,970.

*To all whom it may concern:*

Be it known that I, GAETANO INDORANTE, a subject of the King of Italy, residing at Kankakee, in the county of Kankakee and State of Illinois, have invented certain new and useful Improvements in Balancing Aeroplanes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in aeroplanes and the object in view is to produce a simple and efficient means for balancing the aerocraft and consists of flapping planes or wings arranged in pairs, one set in advance of the other, each pair adapted to be simultaneously flapped in opposite directions in planes at right angles to the forward movement of the aeroplane.

My invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation of the apparatus. Fig. 2 is a top plan view. Fig. 3 is a vertical sectional view taken on line 3—3 of Fig. 1. Fig. 4 is a detail view of one of the rocking bars carrying the balancing wings. Fig. 5 is a sectional view on line 5—5 of Fig. 2. Fig. 6 is a detail perspective view of the shaft and connections with one of the wings, and Figs. 7, 8 and 9 are detail views of parts of the apparatus.

Reference now being had to the details of the drawings by letter, A designates the frame of the apparatus which is mounted upon wheels B, and C is a platform or floor of the car upon which a motor $C'$ is mounted. A propeller shaft $C^2$ is mounted in suitable bearings upon the frame and has fixed thereto a propeller $C^8$ and said shaft $C^2$ transmits motion through the intermeshing beveled wheels $C^x$ with a vertically disposed shaft $C^3$ which in turn is geared to the motor $C'$.

A rudder, designated by letter $C^4$, is fastened to the rear end of the frame and is controlled by intermeshing gears $C^5$ actuated by means of a shaft $C^6$ having knuckle connections with a stub shaft carrying one of said gear wheels $C^5$, the shaft $C^6$ having a suitable hand wheel $C^7$ fixed to one end thereof. Said propelling and steering mechanisms may be of any approved type commonly employed in the art but for which I make no claim, the essence of the present invention consisting in the balancing wings or planes.

A rock bar D is provided with integral collars $D'$ at its ends which are journaled in bearing members $D^2$ near the ends of the bar and which bearing members are held by means of bolts $D^3$ passing through apertures in the frame and which bolts are held by means of nuts $D^4$ fitted to the threaded portions of the bolts $D^3$, as disclosed clearly in Fig. 5 of the drawings. Intermediate the two collars $D'$ are other collars, designated by letter $D^6$, upon the bar D and said intermediate collars are preferably arranged in pairs spaced apart.

Upon reference to Fig. 4 of the drawings, it will be noted that the bar D has an integral collar $D^{6x}$ at its longitudinal center which has a bearing in the under side of the cross-piece F and which latter is fastened by means of braces $F'$ to cross-pieces of the frame. Said collar $D^{6x}$ is suspended and held loosely in its bearing by means of the bolt $D^7$, the head of which has a play at its lower end in the collar and passes through the cross-piece F and is fastened by means of a nut.

Journaled in the collars upon the bar D is a rock shaft K which has fixed thereto bolts $K'$ to which the wing $E^2$ is fastened opposite to a wing E secured to the bar D by means of rods H in a similar manner as wing $E^2$ is secured, one of said rods H being shown clearly in Fig. 4 of the drawings. A wing L is fastened to the shaft K opposite a fourth wing $E^3$ which is secured to the bar D.

Stationary and horizontally disposed planes G are fastened upon the cross-piece

F and intermediate the spaces between the two sets of planes or wings E, E³, L and E². The wings E² and L, it will be noted, are fastened to the rock shaft K in diagonal relation to each other, and the wings E and E³ are secured to the rocking bar D in diagonal relation with each other. When the wings or planes are in operation, the two wings E and E², opposite each other, move in the same direction together, while the wings E³ and L move in the same direction with each other but in opposite directions to the movements of the wings E² and E.

The means for flapping the wings consists of the crank shafts O and O' journaled in cross-pieces A' upon the frame, the two shafts being connected together by means of a bar O² pivoted to the cranks O³ upon said shafts O and O', a rocking motion being imparted to the shaft O through the medium of the crank J' which is fastened to the pitman J which in turn is pivoted to the crank J² of the shaft J³ of the motor M. The wings E and E² are pivotally connected to the cranks at the ends of the rock shaft O by means of the rods S and the wings L and E³ are similarly pivotally connected with cranks at the ends of the shaft O' through the medium of rods T.

In operation, the rotation of the motor shaft J³ causes a rocking of the crank J' and of the shaft O to which it is attached, owing to the difference in length of the cranks J² and J'. This rocking movement of the shaft O causes the wings E, E², E³ and L to flap. The wings may be used either as flapping wings in which case they serve to aid in propelling and lifting the machine, or they may serve as balancing planes, when the machine is passing through lateral air currents, which would affect the stability of the machine. In the latter case, the operator would leave the planes stationary for considerable periods of the time, only occasionally adjusting their inclination to better effect a balancing of the machine.

What I claim to be new is:—

1. A balancing aeroplane comprising a frame, motor and steering apparatus thereon, wings arranged in pairs opposite each other, a rocking bar, bearings in which the same is mounted, a shaft journaled upon said bar, wings secured upon the bar, one upon either side of its longitudinal center and in diagonal relation to each other, diagonally disposed wings fastened to said shaft, horizontally disposed planes intermediate the sets of wings, and means for causing the sets of wings opposite each other to move simultaneously in opposite directions, as set forth.

2. A balancing aeroplane comprising a frame, motor and steering apparatus thereon, wings arranged in pairs opposite each other, a rocking bar, bearings in which the same is mounted, a shaft journaled upon said bar, wings secured upon the bar, one upon either side of its longitudinal center and in diagonal relation to each other, diagonally disposed wings fastened to said shaft, horizontally disposed planes intermediate the sets of wings, crank shafts journaled in a frame of the apparatus, connections between the crank shafts, and pivotal bar connections between the crank shafts and said wings, as set forth.

3. A balancing aeroplane comprising a frame, motor and steering apparatus thereon, wings arranged in pairs opposite each other, a rocking bar, bearings in which the same is mounted, said bar having collars thereon, a shaft journaled in said collars, wings fixed to the bar in diagonal relation, other wings fastened to the shaft in diagonal relation to each other, the wings which are opposite each other upon the shaft and bar adapted to be moved together simultaneously in opposite direction to the wings of the second set, and means for rocking the shaft and bar simultaneously in opposite directions, as set forth.

4. A balancing aeroplane comprising a frame, motor and steering apparatus thereon, wings arranged in pairs opposite each other, a rocking bar, bearings in which the same is mounted, said bar having collars thereon, a shaft journaled in said collars, wings fixed to the bar in diagonal relation, other wings fastened to the shaft in diagonal relation to each other, the wings which are opposite each other upon the shaft and bar adapted to be moved together simultaneously in opposite direction to the wings of the second set, crank shafts journaled upon the frame, pivotal rod connections between the rods and shaft, and stationary planes mounted between each set of wings, as set forth.

5. A balancing aeroplane comprising a frame, motor and steering apparatus thereon, wings arranged in pairs opposite each other, a rocking bar, bearings in which the same is mounted, integral collars upon said bar, the collars at one side of the longitudinal center of the bar arranged opposite to those upon the opposite side of the longitudinal center, wings secured to said bar in diagonal relation and intermediate said collars, a shaft journaled in said collars, wings secured to said shaft in diagonal relation, the wings upon the shaft and bar being arranged in pairs, the sets of wings being adapted to be flapped simultaneously in opposite directions, and planes intermediate the sets of wings, as set forth.

6. A balancing aeroplane comprising a frame, motor and steering apparatus thereon, wings arranged in pairs opposite each other, a rocking bar, bearings in which the same is mounted, integral collars upon said bar, the collars at one side of the longitudinal center of the bar arranged opposite to those upon the opposite side of the longitudinal center, wings secured to said bar in diagonal relation and intermediate said collars, a shaft journaled in said collars, wings secured to said shaft in diagonal relation, the wings upon the shaft and bar being arranged in pairs, rock shafts mounted upon the frame, connections between the rock shafts, and pivotal rod connections between the crank shafts and the wings, as set forth.

In testimony whereof I hereunto affix my signature in the presence of two witnesses.

GAETANO INDORANTE.

Witnesses:
JOHN V. CARVAST,
JOHN PUGLISI.

Copies of this patent may be obtained for five cents each, by addressing the "Commissioner of Patents, Washington, D. C."